United States Patent
Crompton et al.

(10) Patent No.: US 10,180,202 B2
(45) Date of Patent: *Jan. 15, 2019

(54) PUSH-TO-CONNECT FITTING WITH RELEASE ASSISTANCE ASSEMBLY AND DEVICE

(71) Applicant: Quick Fitting, Inc., Warwick, RI (US)

(72) Inventors: David B. Crompton, Tiverton, RI (US); Libardo Ochoa Dias, West Warwick, RI (US)

(73) Assignee: Quick Fitting, Inc., Warwick, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/708,888

(22) Filed: Sep. 19, 2017

(65) Prior Publication Data

US 2018/0001449 A1    Jan. 4, 2018

Related U.S. Application Data

(63) Continuation of application No. PCT/US2016/022881, filed on Mar. 17, 2016, which is a continuation of application No. 14/664,121, filed on Mar. 20, 2015, now Pat. No. 9,322,496.

(51) Int. Cl.
*F16L 19/08* (2006.01)
*F16L 37/091* (2006.01)
*B25B 27/10* (2006.01)

(52) U.S. Cl.
CPC ........... *F16L 19/08* (2013.01); *F16L 37/0915* (2016.05); *B25B 27/10* (2013.01)

(58) Field of Classification Search
CPC ...................................................... F16L 19/08

USPC ......... 285/39, 308, 315, 319, 340, 342, 343, 285/400, 414
See application file for complete search history.

(56) References Cited

U.S. PATENT DOCUMENTS

| | | | |
|---|---|---|---|
| 4,591,192 A | 5/1986 | Van Exel et al. | |
| 4,630,848 A | 12/1986 | Twist et al. | |
| 6,824,172 B1 | 11/2004 | Komolrochanaporn | |
| 7,630,606 B2 | 5/2009 | Yang | |
| 8,205,915 B1 * | 6/2012 | Crompton | F16L 37/0915 285/315 |
| 8,322,755 B2 | 12/2012 | Kluss et al. | |
| 8,491,012 B2 * | 7/2013 | LeQuere | F16L 37/0915 285/340 |
| 8,844,974 B1 | 9/2014 | Crompton et al. | |

(Continued)

OTHER PUBLICATIONS

U.S. Patent and Trademark Office, International Search Report and Written Opinion, PCT/US2016/022881, dated Apr. 15, 2016.

*Primary Examiner* — James M Hewitt, II
(74) *Attorney, Agent, or Firm* — Williams Mullen, PC; Thomas F. Bergert

(57) ABSTRACT

A push-to-connect fitting release assistance assembly, device and method allows for simplified manual operation of a push-to-connect fitting through a clip device capable of manual fit around a fitting adapted for such use. In various embodiments, the clip device comprises a base portion and first and second leg portions, where the leg portions are adapted to provide a gradually increasing or decreasing axial pressure to a release pusher member included as part of the fitting assembly. In various embodiments, the main body component of the fitting is adapted with axially inner, intermediate and outer portions that provide a snug mechanical fit with the clip device.

12 Claims, 8 Drawing Sheets

(56) References Cited

U.S. PATENT DOCUMENTS

| | | | | |
|---|---|---|---|---|
| 9,322,496 B1* | 4/2016 | Crompton | ............... | B25B 27/10 |
| 2003/0057701 A1* | 3/2003 | Koo | ................... | F16L 37/0915 |
| | | | | 285/307 |
| 2004/0239115 A1* | 12/2004 | Wilk, Jr. | ............... | F16L 37/091 |
| | | | | 285/340 |
| 2012/0284994 A1 | 11/2012 | Crompton et al. | | |

* cited by examiner

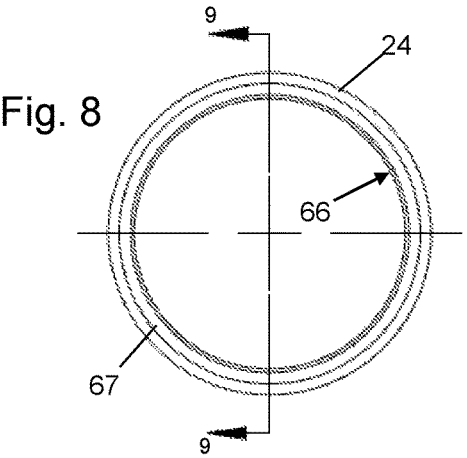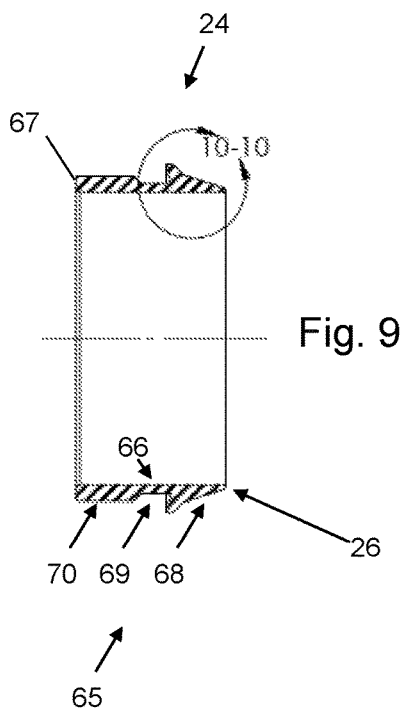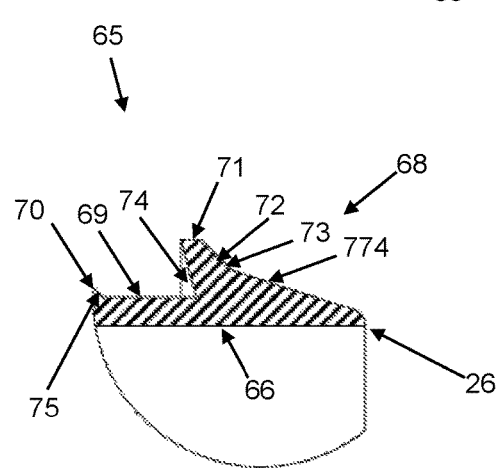

PUSH-TO-CONNECT FITTING WITH RELEASE ASSISTANCE ASSEMBLY AND DEVICE

TECHNICAL FIELD

The present invention relates to fluid flow systems, and more particularly to a push-to-connect fitting release assistance assembly, device and method that facilitates the simple connection, disconnection, repair and re-use of piping and tubing system parts.

BACKGROUND ART

Piping systems exist to facilitate the flow of fluids (e.g., liquid, gas (such as air) or plasma). For example, homes, schools, medical facilities, commercial buildings and other occupied structures generally require integrated piping systems so that water and/or other fluids can be circulated for a variety of uses. Liquids and/or gases such as cold and hot water, breathable air, glycol, compressed air, inert gases, cleaning chemicals, waste water, plant cooling water and paint and coatings are just some examples of the types of fluids and gases that can be deployed through piping systems. Tubing and piping types can include, for example, copper, stainless steel, CPVC (chlorinated polyvinyl chloride) and PEX (cross-linked polyethylene). For purposes of the present disclosure, the term "pipe" or "piping" will be understood to encompass one or more pipes, tubes, piping elements and/or tubing elements.

Piping connections are necessary to join various pieces of pipe and must be versatile in order to adapt to changes of pipe direction required in particular piping system implementations. For example, fittings and valves may be employed at the ends of open pieces of pipe that enable two pieces of pipe to fit together in a particular configuration. Among fitting types there are elbows, "tees", couplings adapted for various purposes such as pipe size changes, ends, ball valves, stop valves, and partial angle connectors, for example.

In the past, pipe elements have been traditionally connected by welding and/or soldering them together using a torch. Soldering pipe fittings can be time-consuming, unsafe, and labor intensive. Soldering also requires employing numerous materials, such as copper pipes and fittings, emery cloths or pipe-cleaning brushes, flux, silver solder, a soldering torch and striker, a tubing cutter and safety glasses, for example. The process for soldering pipes can proceed by first preparing the pipe to be soldered, as the copper surface must be clean in order to form a good joint. The end of the pipe can be cleaned on the outside with emery cloth or a specially made wire brush. The inside of the fitting must be cleaned as well. Next, flux (a type of paste) can be applied to remove oxides and draw molten solder into the joint where the surfaces will be joined. The brush can be used to coat the inside of the fitting and the outside of the pipe with the flux. Next, the two pipes are pushed together firmly into place so that they "bottom out" meet flush inside the fitting. The tip of the solder can be bent to the size of the pipe in order to avoid over-soldering. With the pipes and fitting in place, the torch is then ignited with the striker or by an auto-strike mechanism to initiate soldering. After heating for a few moments, if the copper surface is hot enough such that it melts when touched by the end of the solder, the solder can then be applied to the joint seam so that it runs around the joint and bonds the pipe and fitting together.

In recent years, push-fit technology has been employed with piping systems to reduce the dangers and time involved in soldering joints. Push-fit methods require minimal knowledge of pipe fittings and involve far fewer materials than soldering. For example, one may only need the pipes, quick-connect fittings, a chamfer/de-burring tool and tubing cutter in order to connect pipes using push-fit technology.

The steps involved in connecting piping systems using push-fit technology can be outlined as follows. First, the pipe is cut to the appropriate length and the end of the pipe is cleaned with the de-burring tool. Then the pipe and fitting are pushed together for connection. The fitting is provided with a fastening ring (also called a collet, grip ring or grab ring) having teeth that grip the pipe as it is inserted. The fastening ring device is employed to provide opposing energy, preventing the device from disconnection while creating a positive seal. Accordingly, no wrenches, clamping, gluing or soldering is involved. Push-fit and/or quick-connect technology for piping systems can be obtained, for example, through Quick Fitting, Inc. of Warwick, R.I., USA, suppliers of the CoPro®, ProBite®, LocJaw™, Blue-Hawk™ CopperHead® and Push Connect® lines of push fittings and related products. Also, such technology is described, for example, in U.S. Pat. No. 7,862,089, U.S. Pat. No. 7,942,161, U.S. Pat. No. 8,205,915, U.S. Pat. No. 8,210,576, U.S. Pat. No. 8,398,122, U.S. Pat. No. 8,480,134, U.S. Pat. No. 8,844,974 and U.S. Pat. No. 8,844,981, the disclosures of which are incorporated herein by reference in their entireties.

In past pipe coupling technology, the fastening ring is inserted into the fitting body along with a plastic grip ring support that typically fails under extensive tensile testing. Further, the coupling must then be either coin rolled, glued or receive a threaded cap member to retain the fastening ring inside the fitting body. In addition to the added steps for the manufacture and assembly of the coupling, the strength of the plumbing joint is determined by the retaining cap member. The additional steps and components add significant labor and manufacturing costs to the final product cost and reduce the overall production capability due to the extensive time required for proper assembly.

In addition to the above, when using a threaded retaining cap method, the process of cutting threads into the fitting body and the retaining cap elevates the cost of machining the fitting components. Further, the threaded end cap method requires mechanical assembly as well as the added cost and application of a thread sealant to the threads. In prior efforts that employ a coined retaining cap method, the process of coining the fitting body as the retaining cap significantly increases the cost of final assembly of the fitting. Additionally, the coining process permanently encapsulates the fastening ring inside the fitting, whereby the fastening ring cannot be removed without complete destruction of the ring and fitting.

Along with additional assembly steps and increased manufacturing costs, past pipe fittings and connection methods do not allow repair for various reasons. In some cases, this is because they are factory sealed, for example. In other cases, it is because the separation of the fitting from the pipe can damage or induce wear on the parts. For example, some push-to-connect fittings provide permanently fixed demounting rings for removing the fittings. The demounting rings can be depressed axially to lift the fastening ring teeth off of the surface of the inserted pipe, such that the pipe can then be withdrawn. This arrangement, however, can subject the fittings to tampering and shorter life. In addition, while fastening ring devices work effectively as an opposing retaining member, their functionality makes them nearly impossible to dismount, remove or detach for re-use. The fastening rings are thus permanently affixed unless they are cut and removed, which then destroys the fastening ring.

Whether connected by traditional soldering methods or with push-fit methods, past efforts have been specifically provided for the connection of like materials and lack the ability to connect two unlike materials, such as copper with CPVC, PEX or stainless steel, or any other combination of unlike materials. Past methods further invariably require the replacement of fittings and valves, and do not allow re-use of the fittings or valves in instances where only a small internal component needs to be repaired or replaced.

DISCLOSURE OF INVENTION

The present invention provides, in part, a push fitting assembly package that facilitates the re-use of push fittings without damage to the fitting elements or the pipe. The present invention connects piping using no tools, clamps, solder or glues, while creating a leak-free seal at the connected joining area. Further, unlike prior methods, the present invention can join both like and unlike piping elements in any combination, and without coining or threading the elements into place.

The quick connection pipe joint assembly package provided as part of the present invention employs a release pusher member that, when removed, exposes the clamping, sealing and fastening mechanisms of the fitting. The release pusher member, also called the "release pusher" moves axially and can push the fastening ring of the present invention in order to facilitate the release of a cylindrical object such as a piping element held within the fitting.

For purposes of the present disclosure, a fitting (also referred to as a body member) can encompass a valve member and other piping elements including, but not limited to: a coupling joint, an elbow joint, a tee joint, a stop end, a ball valve member, tubing and other objects having cylindrical openings. In one embodiment of the present invention, one or more sealing member gasket inserts (e.g., O-ring members) fits within a first sealing ring compartment defined in the interior wall of the fitting. In addition, at each pipe receiving end of the fitting, a tube support member compartment is machined into the interior wall to retain at least a portion of the body of the fastening ring. The interior housing elements provide integrated support for the sealing member(s) and fastening ring when opposing force is applied to piping elements that have been inserted into the fitting. In one embodiment, a tube support member is employed to provide additional support for the fastening ring and to cooperate with the release pusher to facilitate connection and disconnection of piping elements with less required force.

The release pusher provided as part of the present invention is employed to facilitate the release of tubing, piping and other cylindrical objects inserted into a fitting. In various embodiments, a clip device acts to push and release the release pusher into/from the cavity formed by the tube support member within the fitting body. When it is desired to release an inserted pipe, for example, from the fitting, the release pusher can be forced in the direction of the fastening ring such that its angular surfaces depress the fastening ring teeth off of the surface of the inserted pipe, thereby allowing the pipe to be removed. The clip is provided with a body portion and leg portions adapted to provide increasing pressure on the axially outer edge of the release pusher as the clip is secured in place around the outside of the fitting. Similarly, when the clip is removed, pressure on the release pusher is gradually decreased, thereby releasing the pusher from the fastening ring teeth to allow the teeth to securely retain any inserted pipe within the fitting. The fitting body is adapted for optimal mechanical connection with the clip device while maintaining proper functioning of internal components maintained within different interior portions of the fitting as described in more detail hereinafter. In various embodiments, the clip member can be operated by a user so as to be able to manipulate the release pusher within the fitting with one hand, while the other hand can insert and/or remove a pipe element.

BRIEF DESCRIPTION OF THE DRAWINGS

FIG. 8 is an end view of a release pusher in accordance with embodiments of the present invention.

FIG. 9 is a right side cross-sectional view taken along the line 9-9 of FIG. 8.

FIG. 10 is a detailed cross-sectional view of encircled portion 10-10 of FIG. 9.

MODES FOR CARRYING OUT THE INVENTION

Figure 1:
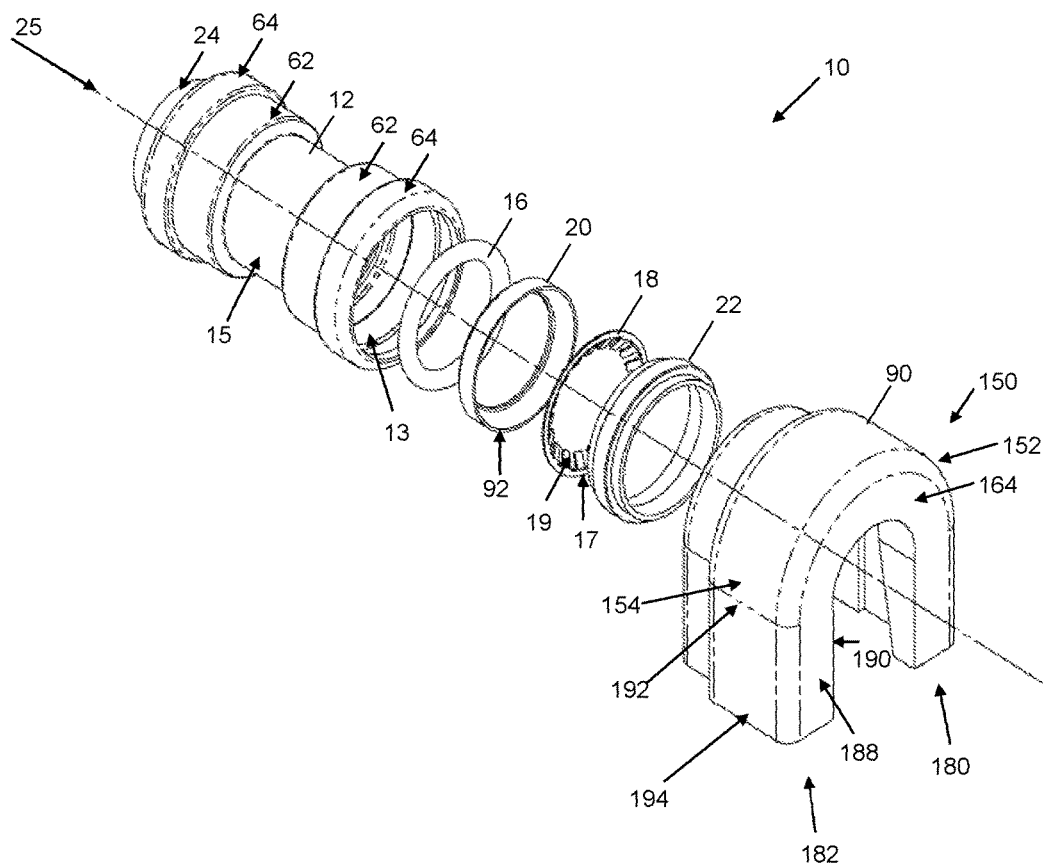
FIG. 1 is an exploded front perspective view of one embodiment of a fitting assembly in accordance with the present invention.
Figure 2:
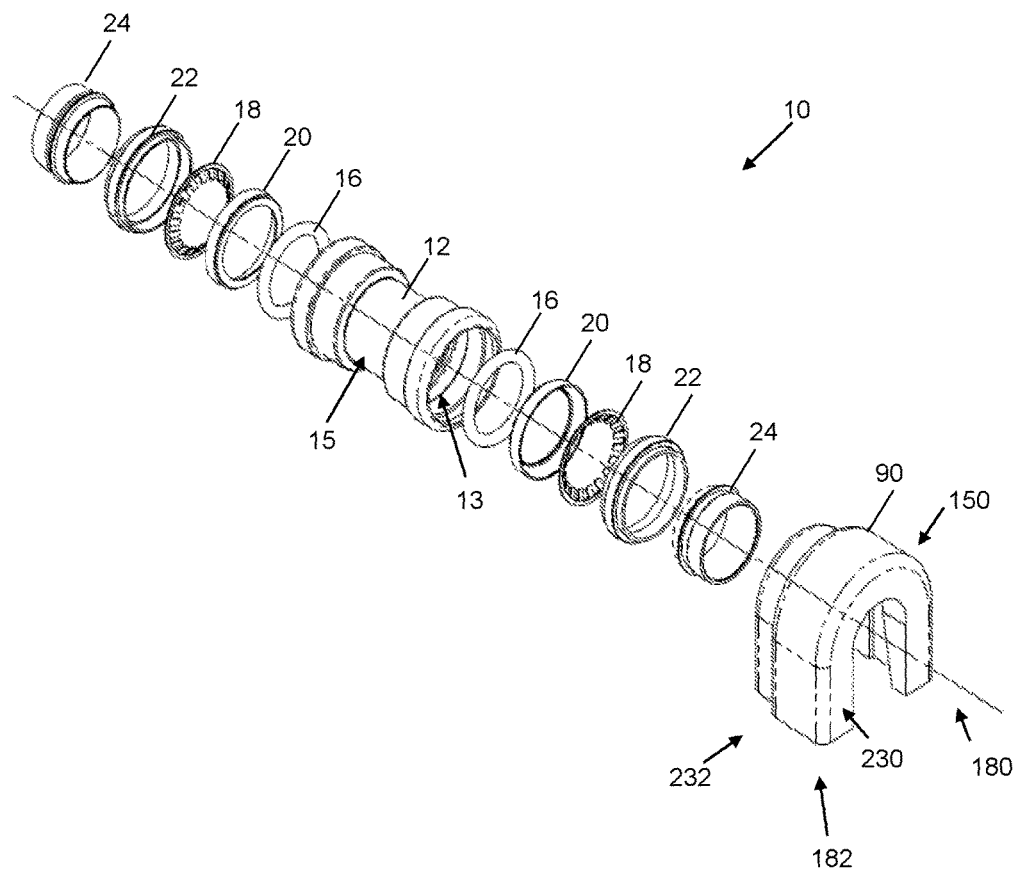
FIG. 2 is an exploded front perspective view of an embodiment of a fitting assembly in accordance of the present invention with inserted package elements in one portion of the fitting.

In the push-to-connect fitting assembly 10 according to embodiments of the present invention as shown in FIGS. 1 and 2, elements of the assembly as shown include: a fitting (i.e., fitting body member or main body component) 12 having an interior wall 13 and exterior wall 15, a fastening ring 18, one or more sealing members 16 (which can be optionally lubricated), a sealing ring support member 20, a tube support member 22 and a release pusher 24. The fastening ring 18 and sealing member 16 together provide one embodiment of a packing arrangement for the present invention, and each has an internal diameter that allows for smooth and snug engagement of a piping or tubing element external surface (not shown) when inserted into the opening 55. The fitting 12 inner wall defines a pipe receiving opening 55 extending axially therethrough along axis 25. In one embodiment, the interior diameters of the fastening ring 18 (as measured to the teeth 19 and not the ring cylindrical base 17) and sealing member 16 are substantially the same, and the interior diameters of the fitting 12 and the release pusher 24 are substantially the same. Further, the interior diameters of the fastening ring 18 and sealing member 16 are slightly less than that of the fitting 12 and release pusher 24 so as to facilitate proper operation of the present invention. The release pusher 24 is substantially cylindrical and includes an external tip 26 at the fastening ring engaging end thereof, as shown in FIGS. 9 and 10, for example.

Figure 3:
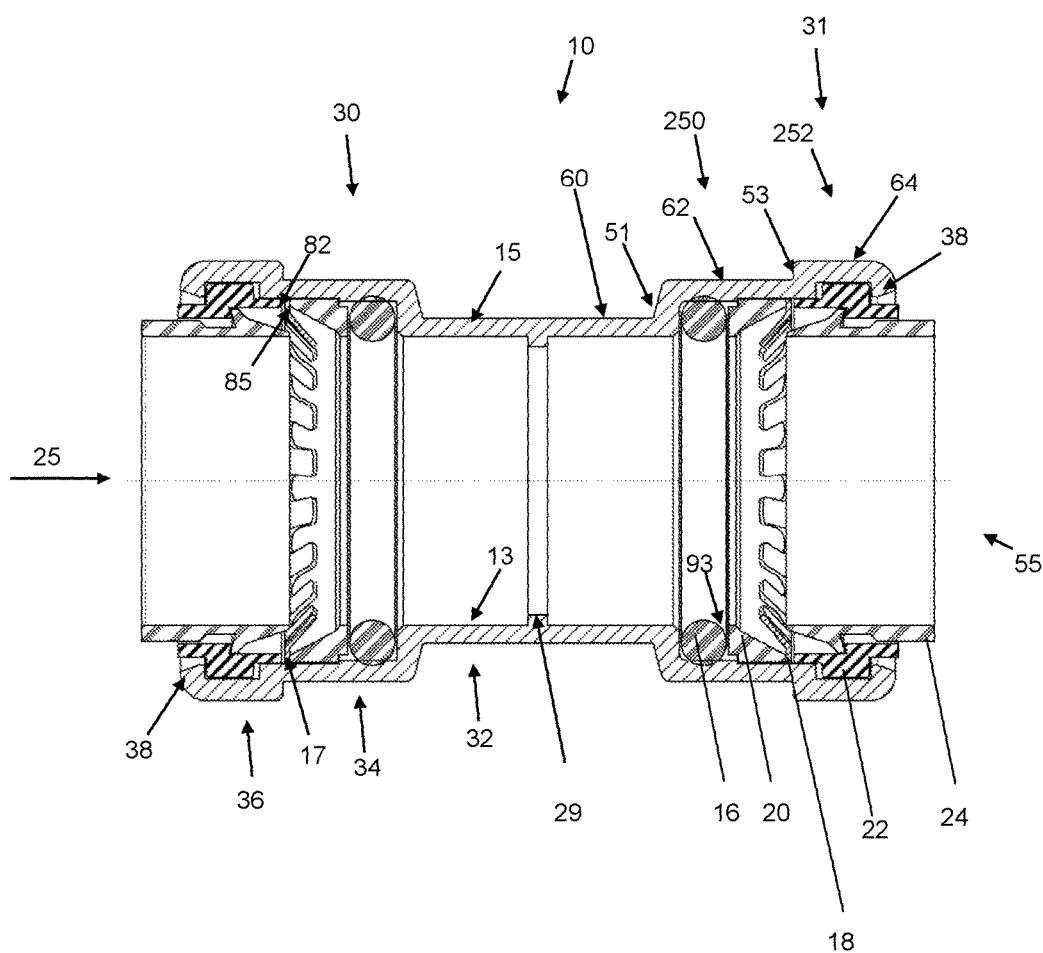
FIG. 3 is a front cross-sectional view of one embodiment of a fitting assembly in accordance with the present invention with inserted fitting elements.
Figure 4:
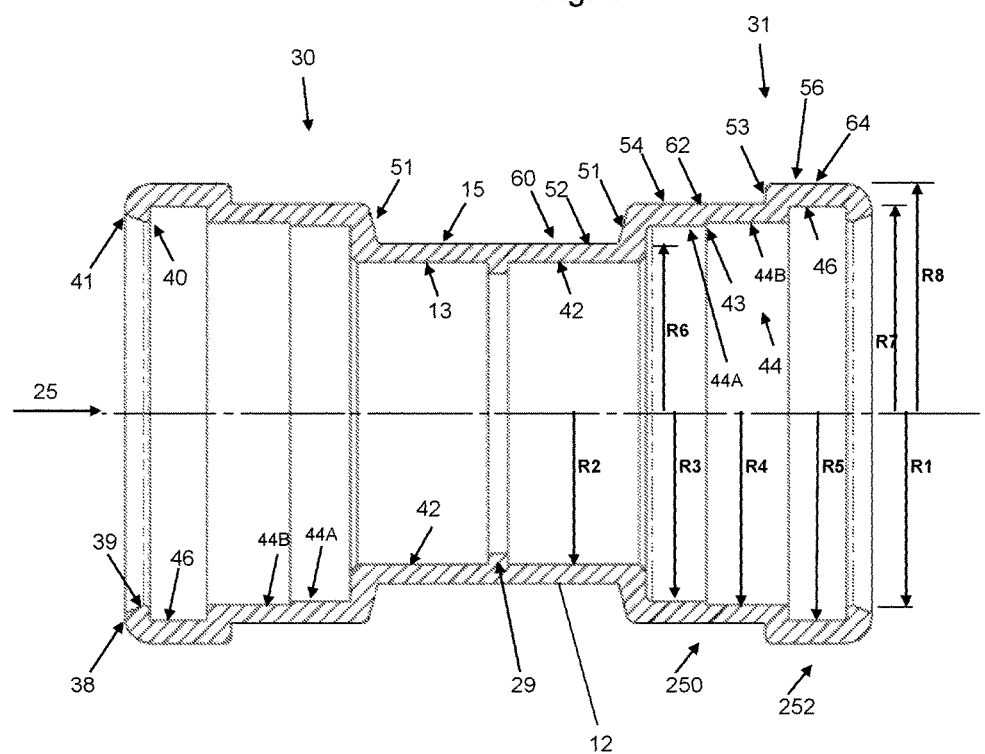
FIG. 4 is a view similar to FIG. 3 with no inserted fitting elements.

As further shown in FIGS. 3 and 4, the main body component 12 includes first 30 and second 31 segments, divided by a tube stop 29. The tube stop 29 extends radially inwardly of the inner surface 13 in order to provide a stopping surface for inserted tubes and pipes. Each of the first 30 and second 31 segments includes an axially inner portion 32, an axially intermediate portion 34 and an axially outer portion 36, with the axially inner portion 32, axially intermediate portion 34 and axially outer portion 36 being integrally formed and each having a respective interior wall 42, 44, 46, exterior wall 52, 54, 56, interior radius R2, R3 and/or R4, R5 and an exterior radius R6, R7, R8, wherein the exterior radius R7 of the axially intermediate portion 34 is larger than the exterior radius R6 of the axially inner portion 32, and wherein the exterior radius R8 of the axially outer portion 36 is larger than the exterior radius R6 of the axially inner portion 32 and the exterior radius R7 of the axially intermediate portion 34. In this way, and among other things, the present invention provides a greater sized opening at the pipe or tubing entry area 55 on the fitting 12 and a tighter opening within the axially inner portion 32. In addition, the sizing and spacing of the axially inner 32, intermediate 34 and outer 36 portions provides greater surface area and resistance and/or gripping surfaces for the clip device 90 as described in greater detail hereinafter. As shown in FIG. 4, a first ridge 51 extends radially outwardly from the outer wall 15 from a wall segment 60 forming a boundary for the axially inner portion 32 to a wall segment 62 forming a boundary for the axially intermediate portion 34. A second ridge 53 extends radially outwardly from wall segment 62 to a wall segment 64 forming a boundary for the axially outer portion 36. The first ridge 51 and the wall segment 62 form a first exterior wall portion 250 of the fitting, and the second ridge 53 and the wall segment 64 form a second exterior wall portion 252 of the fitting, as shown in FIGS. 3, 4, 10 and 11, for example.

As further shown in FIGS. 3 and 4, the axially outer portion 36 of the first segment 30 terminates in an axially outer rim 38 that extends radially inwardly of the interior wall 13. In various embodiments, the axially outer rim 38 has an internal radius R1 that is substantially the same as the axially intermediate portion internal radius R3 or R4. In various other embodiments, the radially inner edge 39 of the axially outer rim 38 is sloped such that the radius varies from a shorter size at the axially inner edge 40 of the radially inner edge 39 to a longer size at the axially outer edge 41 of the radially inner edge 39 of the axially outer rim 38. In this way, the opening formed by the inner edge 39 for a pipe or tubing element to be inserted is more receptive to insertion angles of a pipe or tubing element that may not be perfectly aligned with the axis 25.

As further shown in FIGS. 3 and 4, the interior radius R3 or R4 of the axially intermediate portion 34 is larger than the interior radius R2 of the axially inner portion 32, and the interior radius R5 of the axially outer portion 36 is larger than the interior radius R2 of the axially inner portion 32 and the interior radius R3 or R4 of the axially intermediate portion 34. Additionally, the axially intermediate portion 34 can be provided with a radial step 43 extending radially inwardly such that the axially intermediate portion 34 includes a first interior wall portion 44A having an internal radius R3 and a second interior wall portion 44B having an internal radius R4, where the portions 44A and 44B are separated by the radial step 43. As described elsewhere herein, the radial step 43 assists in providing an engaging surface for the sealing ring support member 20 as part of the packing arrangement provided in accordance with aspects of the present invention.

As shown in FIGS. 3 and 4, a sealing ring 16 is maintained against ridge 51 and within the first interior wall portion 44A of the axially intermediate portion 34 of the main body component 12, and a sealing ring support member 20 is maintained partially within the first interior wall portion 44A and partially within the second interior wall portion 44B of the axially intermediate portion 34 of the main body component 12. In one embodiment of the present invention, a second O-ring or sealing ring can be positioned adjacent the first sealing ring.

Figure 5:
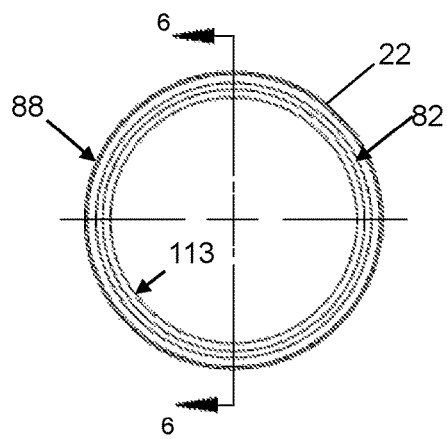
FIG. 5 is an end view of a tube support member in accordance with embodiments of the present invention.
Figure 6:
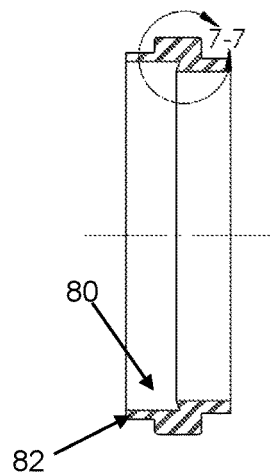
FIG. 6 is a right side cross-sectional view taken along the line 6-6 of FIG. 5.
Figure 7:
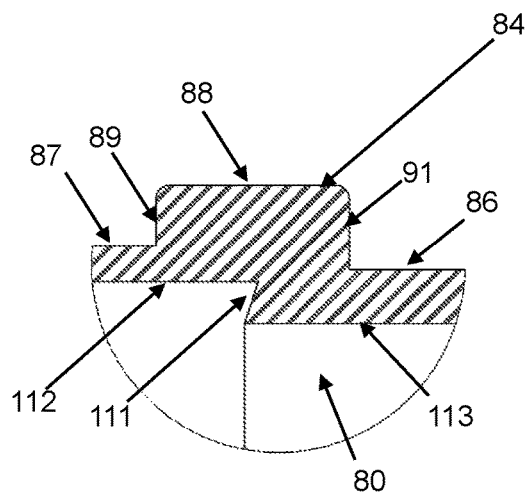
FIG. 7 is a detailed cross-sectional view of encircled portion 7-7 of FIG. 6.

As shown in FIG. 3, for example, the tube support member 22 is maintained against rim 38 and partially within the interior wall 46 of the axially outer portion 36 of the main body component 12 and partially within the second interior wall portion 44B of the axially intermediate portion 34 of the main body component 12. As shown in FIGS. 5 through 7, the tube support member 22 has a radially interior surface 80, against which the release pusher 24 is slidably maintained during operation. The tube support member 22 includes an axially inner edge 82, a retaining lip 111, an axially inner wall segment 112 as part of the radially interior surface 80, and an axially outer wall segment 113 as part of the radially interior surface. The tube support member 22 further includes a radially outer surface 84 comprising an axially inner segment 87, an axially intermediate segment 88 and an axially outer segment 86. As shown in FIG. 7, the axially intermediate segment 88 extends radially outward further than the radial outward extension of the axially inner 87 and outer 86 segments. Further, the axially inner segment 87 extends radially outward further than the radial outward extension of the axially outer segment 86. In this way, the tube support member outer surface 84 can substantially mate with the inner surface 13 of the fitting 12, as the axially outer segment 86 lies in substantially flush engagement with the radially inner edge 39 of the axially outer rim 38, the axially intermediate segment 88 lies in substantially flush engagement with the interior wall 46 of the axially outer portion 36 of the fitting, and the axially inner segment 87 lies in substantially flush engagement with the interior wall portion 44B of the axially intermediate portion 34 of the fitting, as shown in FIG. 3. The tube support member 22 further includes a first wall member 89 extending from the axially inner segment 87 to the axially intermediate segment 88, and a second wall member 91 extending from the axially outer segment 86 to the axially intermediate segment 88. In embodiments of the present invention, the tube support member 22 can comprise a spring steel formulation, and can be provided as a unitary, unsplit member or can be provided with a split similar to the embodiment of the fastening ring described elsewhere herein.

A fastening ring 18 is maintained within the second interior wall portion 44B of the axially intermediate portion 34 of the main body component 12, with the fastening ring base 17 being held between an axially inner edge 82 of the tube support member 22 and an axially outer edge 85 of the sealing ring support member 20. The fastening ring 18, which can be an integral, unsplit ring or can be a split ring member, has a substantially circumferential base 17 with teeth 19 extending radially inwardly therefrom. In the embodiments where the fastening ring is a split ring, the fastening ring can include two circumferential end points (not shown) that do not connect, with fixture points for handling and compressing the fastening ring, such that a tool designed to hold the fastening ring at the fixture points can more easily handle and compress the fastening ring in order to assist with assembly or disassembly of embodiments of the present invention. In this embodiment, and once compressed, the fastening ring is easily insertable into the fitting 12 by releasing the hold on the fixture points, thereby allowing the fastening ring to expand such that the circumferential base engages the walls of the second radial housing element. The fastening can be removed from the second radial housing element in similar manner. No wrenches, solder, welding, glue and/or twisting and turning the elements are required to form or disengage a connection.

The fastening ring 18 can comprise a spring steel formulation, for example, that enables the fastening ring to be malformed during installation, while springing back into its originally manufactured position once installed. The fastening ring is capable of grabbing an inserted pipe's surface via two or more teeth 19 to ensure connections cannot be pulled apart. The fastening ring teeth are angled downward from the substantially cylindrical perimeter of the ring, toward the axially inner portion 32 and away from the axially external portion 36, such that when a pipe is inserted, the teeth exert a pressure against the pipe to discourage the pipe from slipping or moving back out of the fitting. No wrenches, solder, welding, glue and/or twisting and turning the elements are required to form a connection. Specifically, the combination of the fastening ring, an O-ring support member, a tube support member and release pusher provide a push-fit piping assembly when inserted into any cylindrical pipe fitting in accordance with one embodiment of the present invention. As shown in FIGS. 1 through 4, the fastening ring 18 includes a substantially cylindrical base 17 that has a plurality of bifurcated or square edged teeth 19 extending inwardly from and along the base 17. The teeth 19 of the fastening ring 18 can extend at various angles from the base axis as measured when the teeth are at rest position and are not stressed by the insertion of a pipe, for example. The number of teeth can readily vary in number and size.

In one embodiment, the fitting 12 can be forged CW617N brass, with full porting and full flow fitting, for example. The lubricant for the sealing members 16 can be a food grade lubricant, for example. It will be appreciated that the sealing members 16 can comprise a flat ring or washer-type seal member in addition or as an alternative to a circular member of substantially circular cross-section. As shown in FIGS. 1 and 3, the sealing ring support member 20 has a circumferential base 92, an axially inner edge 93 that acts as a sealing member-engaging surface and an axially outer edge 85 that acts as a fastening ring-engaging surface. The sealing ring support member 20 can be comprised of metal or plastic, for example.

As shown in FIGS. 8 through 10, for example, the release pusher 24 is substantially cylindrical and includes an outer wall 65, an inner wall 66, a back edge 67 and a leading tip 26. In various embodiments, the outer wall 65 comprises a leading segment 68, a recessed segment 69 and a trailing segment 70. In various embodiments of the release pusher 24 of the present invention, the leading segment 68 comprises a single linear segment from a radially outer ledge 71 to the leading tip 26. In various other embodiments, as shown in FIG. 10, a first leading outer wall segment 72 extends linearly at a first angle from the radially outer ledge 71 to a leading outer wall intermediate point 73, and a second leading outer wall segment 774 extends linearly from the outer wall intermediate point 73 to the leading tip 26 at a second angle. Further, in various embodiments, the release pusher recessed segment 69 lies radially inwardly of the trailing segment 70 and the radially outer ledge 71, with an outer ledge back wall 74 extending from the outer ledge 71 to the recessed segment 69, and with a trailing segment front wall 75 extending from the trailing segment 70 to the recessed segment 69, as shown in FIG. 10, for example.

The release pusher 24 can comprise an injection-molded plastic material or a metal material such as brass, for example. When pressure is applied on the back edge 67 of the release pusher 24, the leading tip 26 can engage the inside surface of the fastening ring teeth 19, and the outer ledge back wall 74 can removeably engage a retaining lip 111 of the tube support member 22, as shown in FIG. 3. As the release pusher 24 is inserted into the fitting 12, the radially outer ledge 71 is crimped somewhat as it slides along the axially outer wall segment 113 of the tube support member 22. The recessed segment 69 provides sufficient resilience to allow the outer ledge 71 to flex backwardly and away from tip 26 as the release pusher is inserted into the fitting. Once the outer ledge 71 passes the retaining lip 111 of the tube support member, the outer ledge 71 expands such that the outer ledge back wall 74 lies in substantially flush engagement with the retaining lip 111 and the outer ledge 71 lies in substantially flush engagement with the axially inner wall segment 112 of the tube support member 22. In this way, the release pusher 24 is held in place against the tube support member 22 within the fitting 12, as shown in FIG. 3. The acute angle formed between the retaining lip 111 and the axially inner wall segment 112 of the tube support member 22 assists in retaining the release pusher 24 with a stronger retaining force and much higher "failure pressure", meaning the release pusher requires a much higher pulling pressure before it will fail and/or break out of the retained position during testing.

The trailing segment 70 of the release pusher 24 is slidably engaged with the axially outer wall segment 113 once the release pusher 24 is inserted, and this slidable engagement assists the release pusher 24 in traveling substantially along the axis 25 of the fitting during operation. During removal, a tool such as a specially adapted wrench, for example, can be applied to the outer top surface of the release pusher so as to exert a pushing and lifting force that causes the release pusher outer ledge 71 to disengage the retaining lip 111. Once the release pusher is removed, the internal packing arrangement components are exposed for removal and/or replacement as necessary or desired.

As shown in FIGS. 1, 2 and 11 through 15, the clip device 90 in accordance with embodiments of the present invention includes a base portion 150 having a substantially semi-circular body portion 151 that is provided with a first body portion end 152, a second body portion end 154 and a body wall 156. The body wall 156 has an interior surface 158 and an exterior surface 160, with the body wall interior surface 158 defining a cavity 161 extending axially through the base portion 150. The body portion 151 further has an end wall 164 extending radially inwardly of the interior surface of the body wall 156, with the end wall 164 having an outer surface 165, an inner surface 168 and a medial surface 170. As shown in FIGS. 11 through 15, the clip device 90 also includes a first leg portion 180 extending from the first body portion end 152 and having a radially outer surface 173, a radially inner surface 174, a posterior axially outer surface 171, a posterior axially inner surface 172, a posterior medial surface 175, a first leg portion top portion 176 and a first leg portion bottom portion 178, wherein the posterior medial surface 175 has a width that tapers from a first width W1 at the first leg portion top portion 176 to a second width W2 at the first leg portion bottom portion 178, such that the first width W1 is greater than the second width W2. As shown in FIGS. 1 and 11 through 15, the second leg portion 182 extends from the second body portion end 154 and has a radially outer surface 184, a radially inner surface 186, a posterior axially outer surface 188, a posterior axially inner surface (shown at 772 in FIG. 17), a posterior medial surface 190, a second leg portion top portion 192 and a second leg portion bottom portion 194, wherein the posterior medial surface 190 has a width that tapers from a wider dimension at the second leg portion top portion 192 to a smaller dimension at the second leg portion bottom portion 194, similar to that shown for the first leg portion 180 in FIG. 15.

The base portion 150, first leg portion 180 and second leg portion 182 are of unitary construction, and thereby form a monolithic device. The first leg portion posterior axially outer surface 171, posterior axially inner surface 172 and posterior medial surface 175 extend from the end wall 164 of the body portion 151, and the second leg portion posterior axially outer surface 188, posterior axially inner surface (shown at 772 in FIG. 17) and posterior medial surface 190 extend from the end wall 164 of the body portion 151. In various embodiments, as shown in FIGS. 1 through 2, the first leg portion 180 and second leg portion 182 extend from the base portion 150 in substantially parallel relation. As such, the leg portions 180, 182 are substantially mirror images of one another.

Figure 11:
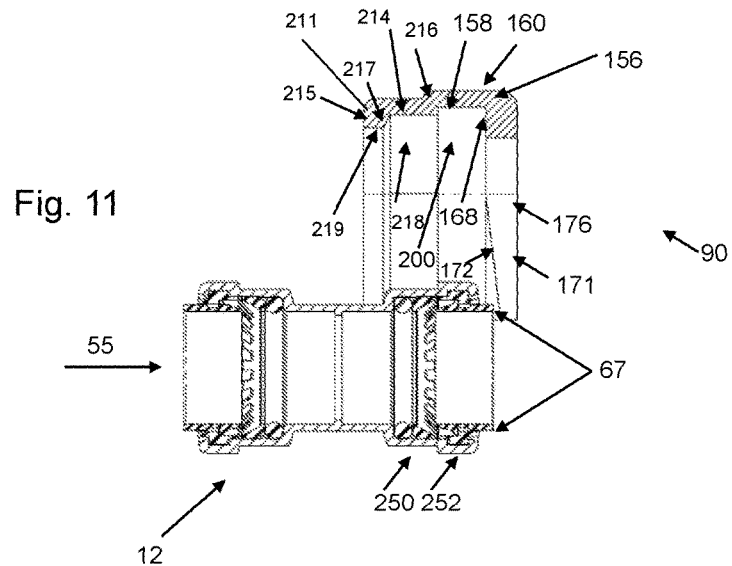
FIGS. 11 through 13 are front cross-sectional views of different stages of advancement of a clip device in accordance with embodiments of the present invention as it is secured around a fitting end and engages a release pusher in accordance with embodiments of the present invention.
Figures 12, 13:
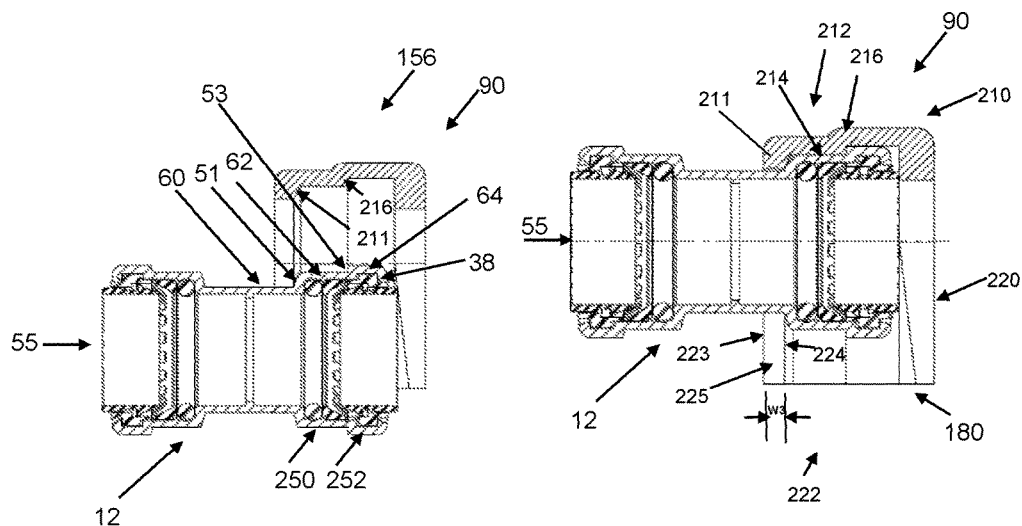
Figure 14:
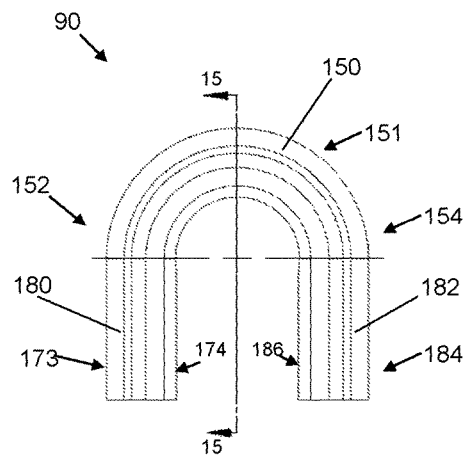
FIG. 14 is a front view of a clip device in accordance with embodiments of the present invention.
Figure 15:
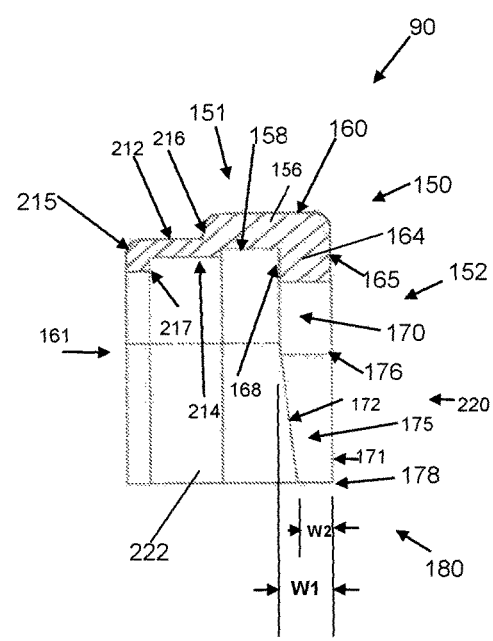
FIG. 15 is a right side cross-sectional view taken along line 15-15 of FIG. 14.

In various embodiments, as shown in FIG. 11, for example, the body wall interior surface 158 and the end wall inner surface 168 help define a clip axially outer end engaging compartment 200. As shown in FIG. 13, the body wall 156 includes a posterior portion 210 and an anterior portion 212, the first leg portion 180 includes a posterior portion 220 and an anterior portion 222, and, as shown in FIG. 2, the second leg portion 182 includes a posterior portion 230 and an anterior portion 232. As shown in FIG. 13, the body wall anterior portion 212 extends radially inwardly of the body wall posterior portion 210. The body wall anterior portion 212 further includes a radially inner surface 214 and an axially outer wall 216, wherein the body wall anterior portion radially inner surface 214 helps define a fitting axially interior engaging compartment 218.

As further shown in FIGS. 11 and 12, the body wall 156 includes a lead wall 211 extending radially inwardly of the axially interior portion of the body wall anterior portion radially inner surface 214, with the lead wall 211 including an outer surface 215, an inner surface 217 and a medial surface 219, and wherein the lead wall inner surface 217 and the body wall anterior portion radially inner surface 214 further define the fitting axially interior engaging compartment 218. The axially outer wall 216 of the body wall anterior portion 212 further defines the fitting axially outer end engaging compartment 200, along with the body wall interior surface 158 and the end wall inner surface 168.

As shown in FIG. 13, the first leg portion 180 includes an anterior axially outer surface 223, an anterior axially inner surface 224, and an anterior medial surface 225 extending from the lead wall 211. The second leg portion 182 includes an anterior axially outer surface 523, an anterior axially inner surface 524, and an anterior medial surface 525 (all shown in FIG. 17) extending from the lead wall 211, and these elements are substantially mirrored versions of their counterparts 223, 224 and 225, respectively, of the first leg portion 180. As shown in FIG. 13, the first leg portion anterior medial surface 225 and the lead wall 211 have a width W3, and this width W3 is less than the widths W1 and W2 of the first leg portion posterior medial surface 175 shown in FIG. 15, in various embodiments of the present invention. The second leg portion 182 includes an anterior medial surface of similar width such that the leg portions are substantially uniform and mirror images of one another. It will be appreciated that the width dimension W3 is sufficient to provide locking and/or retaining force when the leg portions 180, 182 are positioned downwardly about a main body component 12, as shown in FIGS. 11 through 13, for example. It will also be appreciated that the widths W1 and W2 are of sufficient dimension to provide an axially inward pushing force to the end 67 of the release pusher 24 as external force is applied to the clip 90 along the outer surface 160 of the body wall 156, as illustrated by the sequence in FIGS. 11 through 13.

As shown in FIGS. 11 through 13, the interior surfaces 217, 214, 158 and 168 are adapted to engage the first 250 and second 252 exterior wall portions of the main body component 12. As force is applied to the outer surface 160 of the body wall 156, the posterior axially inner surfaces (e.g., 172 of first leg portion 180) contacts the end 67 of the release pusher member 24 so as to influence axial sliding movement of the release pusher member 24 within the cavity 55. As shown in FIGS. 11 through 15, the release device base portion 150 has a substantially semi-circular body portion 151 having a first body portion end 152, a second body portion end 154 and a body wall 156, wherein the end wall 164 has an outer surface 165, an inner surface 168 and a medial surface 170. In various embodiments, the interior surface 217 extends radially inwardly of the body wall anterior portion radially inner surface 214 at a substantially perpendicular angle, as shown in FIGS. 11 through 13. In various other embodiments, as shown in FIG. 16, for example, the interior surface 217 extends radially inwardly of the body wall anterior portion radially inner surface 214 at a substantially obtuse angle, such that the interior surface 217 engages and directly abuts ridge 51 substantially along the entire external surface of the ridge 51 when engaged with the fitting.

In operation, the main body component 12 of the present invention is provided and one or more sealing members 16 are inserted into the axially intermediate portion 34 of the main body component 12 and retained against the first interior wall portion 44A thereof. Next, the sealing ring support member 20 is inserted so as to fit snugly within the axially intermediate portion 34 of the main body component 12, and retained against the first 44A and second 44B interior wall portions. The support member 20 abuts the sealing ring member 16, as shown in FIG. 3, for example. The fastening ring 18 is then inserted such that its base 17 is securely retained against the second interior wall portion 44B of the axially intermediate portion 34 of the main body component 12, and the base is further securely retained between the sealing ring support member 20 and the tube support member 22. The tube support member is inserted so as to be retained in the axially outer portion 36 and the second interior wall portion 44B of the axially intermediate portion 34 of the main body component, as well as against the inner wall of the outer rim 38 of the main body component 12. The release pusher is then inserted as described above. The clip 90 is then positioned around the external surfaces 250, 252 of the main body component 12, and as force is applied, the leg posterior axially inner surfaces (e.g., 172) push the edge 67 of the release pusher 24 axially inwardly so as to slide inwardly along the inner surface of the tube support member 22 and thereby push the teeth 19 of the fastening ring 18 axially inwardly. In this way, sufficient room is created for a pipe member to be inserted.

Figure 16:
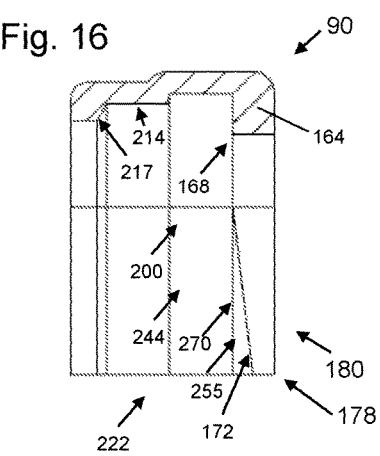
FIG. 16 is a right side cross-sectional view of an alternative embodiment of the clip member of the present invention.
Figure 17:
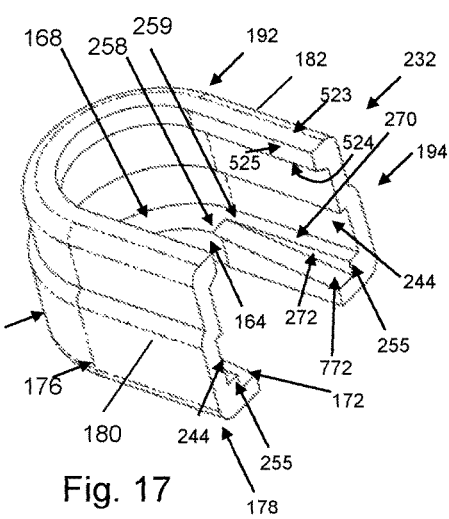
FIG. 17 is a perspective view of the embodiment of the clip member of FIG. 16.

In an alternative embodiment of the clip 90, as shown in FIGS. 16 and 17, the leg posterior axially inner surface 172 does not extend to the inner wall 244 of the axially outer end engaging compartment 200 of the clip 90, as it does in the embodiment shown in FIGS. 11 through 15. Rather, it extends towards wall 244 and meets a leg platform 255 which extends radially inwardly of wall 244. Thus, in this embodiment, the end wall 164 of the body portion 151 of the clip 90 extends to the top portion 176 of leg portions 180 and 182, and then the radially exterior portion 259 of the end wall 164 extends in the form of leg platforms 255 to the bottom portion 178 of leg portions 180, 182. Further, the radially interior portion 258 of the end wall 164 extends to the top portion 176 of leg portions 180, 182, and then the leg portions 180, 182 extend to respective bottom portions 178 in sloped fashion, as shown and described with regard to FIG. 15 above and in connection with widths W1 and W2 shown therein. Leg platforms 255 include a rim engaging surface 270 and a riser surface 272 extending from the posterior axially inner surfaces 172 of the legs 180, 182 to the rim engaging surface 270. As shown in FIGS. 16 and 17, the rim engaging surface 270 is coplanar with the interior surface 168 of the wall 164.

In this way, as the clip 90 is positioned around the main body component 12, and as force is applied, the leg posterior axially inner surfaces 172 push the edge 67 of the release pusher 24 axially inwardly while the rim engaging surfaces 270 of the leg platforms 255 engage the axially outer rim 38 of the main body component 12. The extra engagement of the leg platforms 255 with the main body component 12 enhances stability and effectiveness of the clip 90 during operation. It will be appreciated that the action of the clip 90 in pushing the edge 67 of the release pusher 24 creates room for a pipe member to be inserted similar to that described above.

When a pipe is inserted, it travels through the release pusher 24 into the pipe receiving cavity 55 of the main body component 12, engaging the fastening ring 18 and the sealing member 16. When the pipe is fully inserted (i.e., when the leading edge of the pipe contacts tube stop 29), the clip 90 can be raised away from the main body component 12, allowing the release pusher 24 to return to its relaxed and engaged position with the retaining lip 111 of the tube support member 22. In this position, the teeth 19 of the fastening ring 18 engage the side walls of the inserted pipe in order to retain the pipe securely within the main body component 12. The sealing members provide a strong, leak-free seal and the combination of the sealing ring support member 20, the fastening ring 18 and the tube support member 22 prohibits any inclination an inserted pipe may have to slide out of position. It will be appreciated that the elements of the present invention permit a user to manually hold the clip 90 and the fitting 12 in one hand, apply pressure to the clip 90 with the same hand, such that the pressure is transferred to the release pusher 24 and thus the fastening ring teeth 19. A pipe held in the user's other hand can then be inserted or withdrawn while the fastening ring teeth 19 are in the extended position caused by the release pusher pressure. Once the pipe is either inserted or removed, the user can release the pressure being applied to the clip 90 using the same hand that has been holding the clip and fitting, to thereby release the pressure being applied by the release pusher on the fastening ring teeth 19.

The angles, dimensions and materials described herein will be understood to be exemplary and provided as embodiments associated with proper working operation of the present invention. Further, it will be appreciated that, in one embodiment of the present invention, the members of the push connect joint assembly can be formed through hydroforming processes. Additionally, embodiments of the present invention can be provided whereby the fitting and/or main body component includes independent packing arrangements on both sides of the tube stop 29, where the packing arrangements comprise at least two of the following: sealing ring, sealing ring support member, fastening ring, tube support member, release pusher, as shown in FIGS. 2 and 3, for example.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A fitting, comprising:
a main body component comprising an interior wall and an exterior wall, wherein the interior wall defines a cavity extending axially through the main body component, wherein the main body component further comprises a first segment having an axially inner portion, an axially intermediate portion and an axially outer portion, with the axially inner portion, axially intermediate portion and axially outer portion being integrally formed and each having a respective interior wall, exterior wall and an interior radius, wherein the interior radius of the axially inner portion is smaller than the interior radius of the axially intermediate portion, and wherein the interior radius of the axially intermediate portion is smaller than the interior radius of the axially outer portion, wherein the axially intermediate portion comprises a radial step extending radially inwardly such that the axially intermediate portion comprises a first interior wall portion and a second interior wall portion separated by the radial step, wherein the first interior wall portion and the second interior wall portion have a respective interior radius, and wherein the second interior wall portion radius is larger than the first interior wall portion radius;
at least one sealing ring maintained within the first interior wall portion of the axially intermediate portion of the main body component;
a tube support member maintained within the interior wall of the axially outer portion of the main body component and the second interior wall portion of the axially intermediate portion of the main body component, wherein the tube support member has an interior surface;

a fastening ring maintained within the second interior wall portion of the axially intermediate portion of the main body component; and a sealing ring support member maintained against the second interior wall portion and between the at least one sealing ring and the fastening ring.

2. The fitting of claim 1, further comprising a release pusher slidably maintained against the interior surface of the tube support member.

3. The fitting of claim 1, wherein the axially outer portion of the first segment terminates in an axially outer rim that extends radially inwardly of the interior wall.

4. The fitting of claim 3, wherein the axially outer rim has an internal radius that is substantially the same as the axially intermediate portion interior radius.

5. The fitting of claim 3, wherein the axially outer rim has an internal radius that is substantially the same as the first interior wall portion interior radius.

6. The fitting of claim 3, wherein the axially outer rim has an internal radius that is substantially the same as the second interior wall portion interior radius.

7. A fitting, comprising:
a main body component having an interior wall and an exterior wall, wherein the interior wall defines a cavity extending axially through the main body component, wherein the main body component comprises a first segment integrally formed with a second segment, wherein the first segment comprises:
a first segment axially inner portion, a first segment axially intermediate portion and a first segment axially outer portion, with the first segment axially inner portion, first segment axially intermediate portion and first segment axially outer portion being integrally formed and each having a respective interior radius, wherein the interior radius of the first segment axially intermediate portion is larger than the interior radius of the first segment axially inner portion, and wherein the interior radius of the first segment axially outer portion is larger than the interior radius of the first segment axially inner portion and the interior radius of the first segment axially intermediate portion, wherein the first segment axially intermediate portion includes a first radial step extending radially inwardly such that the first segment axially intermediate portion includes a first segment first interior wall portion and a first segment second interior wall portion separated by the radial step, wherein the first segment first interior wall portion and the first segment second interior wall portion have a respective interior radius, and wherein the first segment second interior wall portion radius is larger than the first segment first interior wall portion radius;

wherein the second segment comprises:
a second segment axially inner portion, a second segment axially intermediate portion and a second segment axially outer portion, with the second segment axially inner portion, second segment axially intermediate portion and second segment axially outer portion being integrally formed and each having a respective interior radius, wherein the interior radius of the second segment axially intermediate portion is larger than the interior radius of the second segment axially inner portion, and wherein the interior radius of the second segment axially outer portion is larger than the interior radius of the second segment axially inner portion and the interior radius of the second segment axially intermediate portion, wherein the second segment axially intermediate portion includes a second radial step extending radially inwardly such that the second segment axially intermediate portion includes a second segment first interior wall portion and a second segment second interior wall portion separated by the radial step, wherein the second segment first interior wall portion and the second segment second interior wall portion have a respective interior radius, and wherein the second segment second interior wall portion radius is larger than the second segment first interior wall portion radius;

at least one sealing ring maintained within the first interior wall portion of the first segment axially intermediate portion;

at least one sealing ring maintained within the first interior wall portion of the second segment axially intermediate portion;

a first tube support member maintained within the interior wall of the first segment axially outer portion and the first segment second interior wall portion of the first segment axially intermediate portion;

a second tube support member maintained within the interior wall of the second segment axially outer portion and the second segment second interior wall portion of the second segment axially intermediate portion;

a first fastening ring maintained within the first segment second interior wall portion of the first segment axially intermediate portion;

a second fastening ring maintained within the second segment second interior wall portion of the second segment axially intermediate portion;

a first sealing ring support member maintained against the first segment second interior wall portion and between the at least one sealing ring maintained within the first interior wall portion of the first segment axially intermediate portion and the first fastening ring; and a second sealing ring support member maintained against the second segment second interior wall portion and between the at least one sealing ring maintained within the first interior wall portion of the second segment axially intermediate portion and the second fastening ring.

8. The fitting of claim 7, wherein each of the first and second tube support members has an interior surface, and further comprising a first release pusher slidably maintained against the interior surface of the first tube support member and a second release pusher slidably maintained against the interior surface of the second tube support member.

9. The fitting of claim 7, wherein the axially outer portion of the first segment terminates in a first segment axially outer rim that extends radially inwardly of the interior wall.

10. The fitting of claim 9, wherein the first segment axially outer rim has an internal radius that is substantially the same as the first segment axially intermediate portion interior radius.

11. The fitting of claim 9, wherein the first segment first interior wall portion has a first interior wall portion interior radius, the first segment second interior wall portion has a second interior wall portion interior radius, and the first segment axially outer rim has an internal radius that is substantially the same as the first interior wall portion interior radius or the second interior wall portion interior radius.

12. The fitting of claim 9, wherein the first segment first interior wall portion has a first interior wall portion interior radius, the first segment second interior wall portion is axially outward of the first segment first interior wall portion and has a second interior wall portion interior radius that is greater than the first interior wall portion interior radius, and further wherein the first segment axially outer rim has an internal radius that is substantially the same as the second interior wall portion interior radius.

* * * * *